(12) United States Patent
Kim et al.

(10) Patent No.: US 10,914,033 B2
(45) Date of Patent: Feb. 9, 2021

(54) LAUNDRY TREATMENT MACHINE

(71) Applicant: LG Electronics Inc., Seoul (KR)

(72) Inventors: Jongryul Kim, Seoul (KR); Doohyun Kim, Seoul (KR); Hyungman Park, Seoul (KR)

(73) Assignee: LG Electronics Inc., Seoul (KR)

(*) Notice: Subject to any disclaimer, the term of this patent is extended or adjusted under 35 U.S.C. 154(b) by 207 days.

(21) Appl. No.: 15/952,906

(22) Filed: Apr. 13, 2018

(65) Prior Publication Data
US 2018/0298548 A1 Oct. 18, 2018

(30) Foreign Application Priority Data
Apr. 14, 2017 (KR) .................. 10-2017-0048678

(51) Int. Cl.
| | |
|---|---|
| *D06F 58/30* | (2020.01) |
| *D06F 58/04* | (2006.01) |
| *D06F 58/26* | (2006.01) |
| *D06F 58/38* | (2020.01) |
| *D06F 103/08* | (2020.01) |
| *D06F 103/36* | (2020.01) |
| *D06F 105/24* | (2020.01) |
| *D06F 105/28* | (2020.01) |

(52) U.S. Cl.
CPC ............. *D06F 58/30* (2020.02); *D06F 58/04* (2013.01); *D06F 58/26* (2013.01); *D06F 58/38* (2020.02); *D06F 2103/08* (2020.02); *D06F 2103/36* (2020.02); *D06F 2105/24* (2020.02); *D06F 2105/28* (2020.02)

(58) Field of Classification Search
CPC .......... D06F 58/26; D06F 58/30; D06F 58/04; D06F 58/38; D06F 2103/08; D06F 2103/36; D06F 2105/24; D06F 2105/28
See application file for complete search history.

(56) References Cited

U.S. PATENT DOCUMENTS

| | | | |
|---|---|---|---|
| 2006/0101589 A1* | 5/2006 | Hong ..................... | D06F 25/00 8/158 |
| 2013/0298337 A1* | 11/2013 | Doh ...................... | D06F 39/008 8/137 |
| 2015/0128658 A1* | 5/2015 | Jang ........................ | H02P 6/18 68/140 |
| 2016/0138208 A1* | 5/2016 | Bison ..................... | D06F 58/30 34/77 |

* cited by examiner

*Primary Examiner* — Jessica Yuen
(74) *Attorney, Agent, or Firm* — Fish & Richardson P.C.

(57) ABSTRACT

The present disclosure relates to a laundry treatment machine. The laundry treatment machine according to an embodiment of the present invention includes a casing; a door attached to the casing; a washing tub disposed inside the casing; a heating unit; a blower for supplying to the washing tub; a temperature detector for detecting a temperature of the washing tub; a motor for rotating the washing tub; a driving unit for driving the motor; and a controller to control the blower to operate in a first drying mode, and to control the heating unit to intermittently output a first power during a first period after the operation of the blower while controlling an operating time of the heating unit to increase during the first period. Accordingly, the power consumption can be reduced while reducing the drying period in the drying mode.

13 Claims, 18 Drawing Sheets

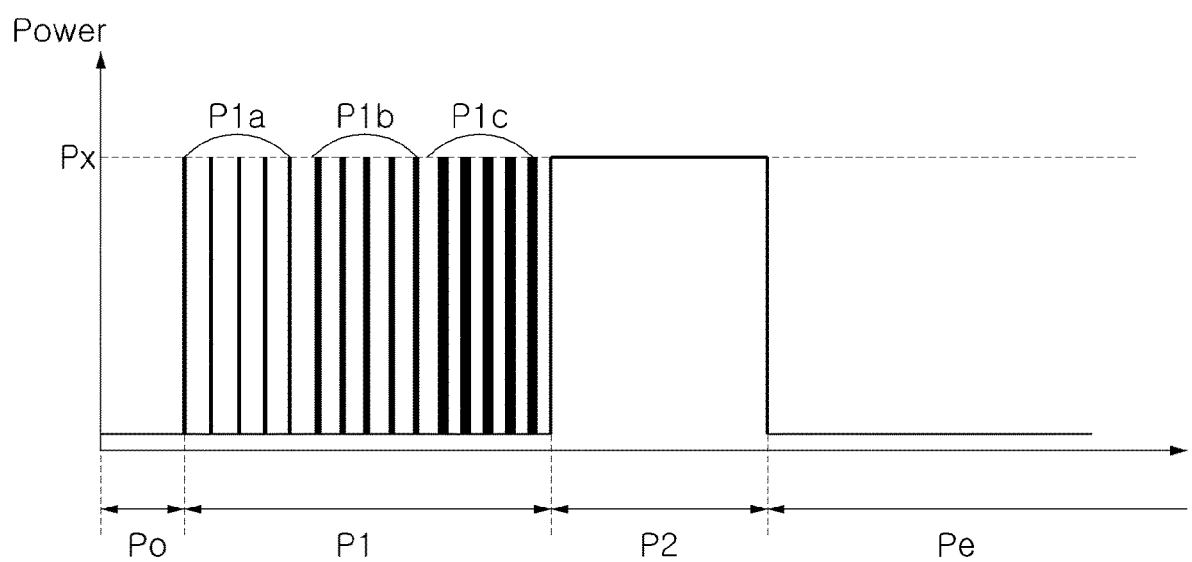

(a)  (b)  (c)

(a)  (b)  (c)

LAUNDRY TREATMENT MACHINE

CROSS-REFERENCE TO RELATED APPLICATION

This application claims the priority benefit of Korean Patent Application No. 10-2017-0048678, filed on Apr. 14, 2017, in the Korean Intellectual Property Office, the disclosure of which is incorporated herein by reference.

BACKGROUND

1. Field

The present invention relates to a laundry treatment machine, and more particularly, to a laundry treatment machine capable of reducing power consumption while reducing a drying period in a drying mode.

2. Description of the Related Art

In general, a laundry treatment machine implements laundry washing using friction between laundry and a washing tub that is rotated upon receiving drive power of a motor in a state in which detergent, wash water and laundry are introduced into the washing tub. Such a laundry treatment machine may achieve laundry washing with less damage to laundry and without tangling of laundry.

Meanwhile, the laundry treatment machine may operate in a drying mode for drying the cloth in the washing tub. To this end, the laundry treatment machine operates a heating unit, in the drying mode.

Meanwhile, the heating unit consumes most amount of electric power in the laundry treatment machine, and accordingly, a method of operating the drying mode while reducing power consumption has been developed.

SUMMARY

The present invention has been made in view of the above problems, and provides a laundry treatment machine capable of reducing power consumption while reducing a drying period in a drying mode.

In accordance with an aspect of the present invention, a laundry treatment machine includes: a casing; a door attached to the casing; a washing tub disposed inside the casing; a heating unit; a blower for supplying to the washing tub; a temperature detector for detecting a temperature of the washing tub; a motor for rotating the washing tub; a driving unit for driving the motor; and a controller to control the blower to operate in a first drying mode, and to control the heating unit to intermittently output a first power during a first period after the operation of the blower while controlling an operating time of the heating unit to increase during the first period.

The controller controls, in a first drying mode, the heating unit to be repeatedly turned on and off during a first interval to a third interval of the first period, and to control a turned-on period of the heating unit to increase when proceeding from the first interval to the third interval.

The controller controls, in the first drying mode, the heating unit to continuously output the first power during a second period, when the temperature detected by the temperature detector is lower than or equal to a first reference value after the first period.

The heating unit includes a first heater and a second heater, wherein the controller controls both the first heater and the second heater to operate during the first period and the second period.

The controller controls, in the first drying mode, the heating unit to alternately output the first power and a second power lower than the first power during a third period after the second period, and controls the heating unit to output the first power during a fourth period after the third period.

The controller controls, in the first drying mode, the heating unit to continuously output a second power lower than the first power during a second period, when the temperature detected by the temperature detector exceeds a first reference value after the first period The heating unit comprises a first heater and a second heater, wherein the controller controls both the first heater and the second heater to operate during the first period, and to control only one of the first heater and the second heater to operate during the second period.

The controller controls, in the first drying mode, the heating unit to alternately output the first power and the second power during a third period after the second period, and controls the heating unit to output the first power during a fourth period after the third period.

The controller controls, in the first drying mode, the heating unit to be turned off, when a humidity of the washing tub is equal to or lower than a first reference humidity and an operation time of the first drying mode is within a second reference value.

The controller controls, in the first drying mode, the blower to be turned off, when the humidity of the washing tub is equal to or lower than a second reference humidity lower than the first reference humidity after the heating unit is turned off.

The controller controls, in the first drying mode, the turned-on period of the heating unit to increase in proportion to an amount of laundry in the washing tub, during the first interval to the third interval of the first period.

The controller controls, in the first drying mode, the first period and the second period to increase in proportion to an amount of laundry in the washing tub.

The controller controls, in a second drying mode, the heating unit to continuously output the first power, controls the heating unit to continuously output a second power lower than the first power after outputting the first power, and controls the heating unit to continuously output the first power again after outputting the second power. In accordance with another aspect of the present invention, a laundry treatment machine includes: a casing; a door attached to the casing; a washing tub disposed inside the casing; a heating unit; a blower for supplying to the washing tub; a temperature detector for detecting a temperature of the washing tub; a motor for rotating the washing tub; a driving unit for driving the motor; and a controller to control, in a first drying mode, a power outputted from the heating unit to increase sequentially during a first period, and to control the power outputted from the heating unit to be constant during a second period.

The controller controls, in a second drying mode, the heating unit to continuously output a first power, controls the heating unit to continuously output a second power lower than the first power after outputting the first power, and controls the heating unit to continuously output the first power again after outputting the second power.

The controller controls, in the first drying mode, the heating unit to continuously output, during a second period, the second power lower than the first power that is outputted during the first period, when the temperature detected by the temperature detector exceeds a first reference value after the first period.

The controller controls the heating unit to continuously output the first power, after the second period, and controls the heating unit to be turned off, and controls only the blower to operate, after outputting the first power continuously, when a humidity of the washing tub is equal to or lower than a first reference humidity and an operation time of the first drying mode is within a second reference value, during the second period.

The controller controls the blower to be turned off after outputting the first power continuously, when the humidity of the washing tub is equal to or lower than a second reference humidity lower than the first reference humidity, during the second period.

The controller controls, in the first drying mode, the first period and the second period to increase in proportion to an amount of laundry in the washing tub.

BRIEF DESCRIPTION OF THE DRAWINGS

The objects, features and advantages of the present invention will be more apparent from the following detailed description in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. With respect to constituent elements used in the following description, suffixes "module" and "unit" are given only in consideration of ease in the preparation of the specification, and do not have or serve as specially important meanings or roles. Thus, the "module" and "unit" may be mingled with each other.

Figure 1:
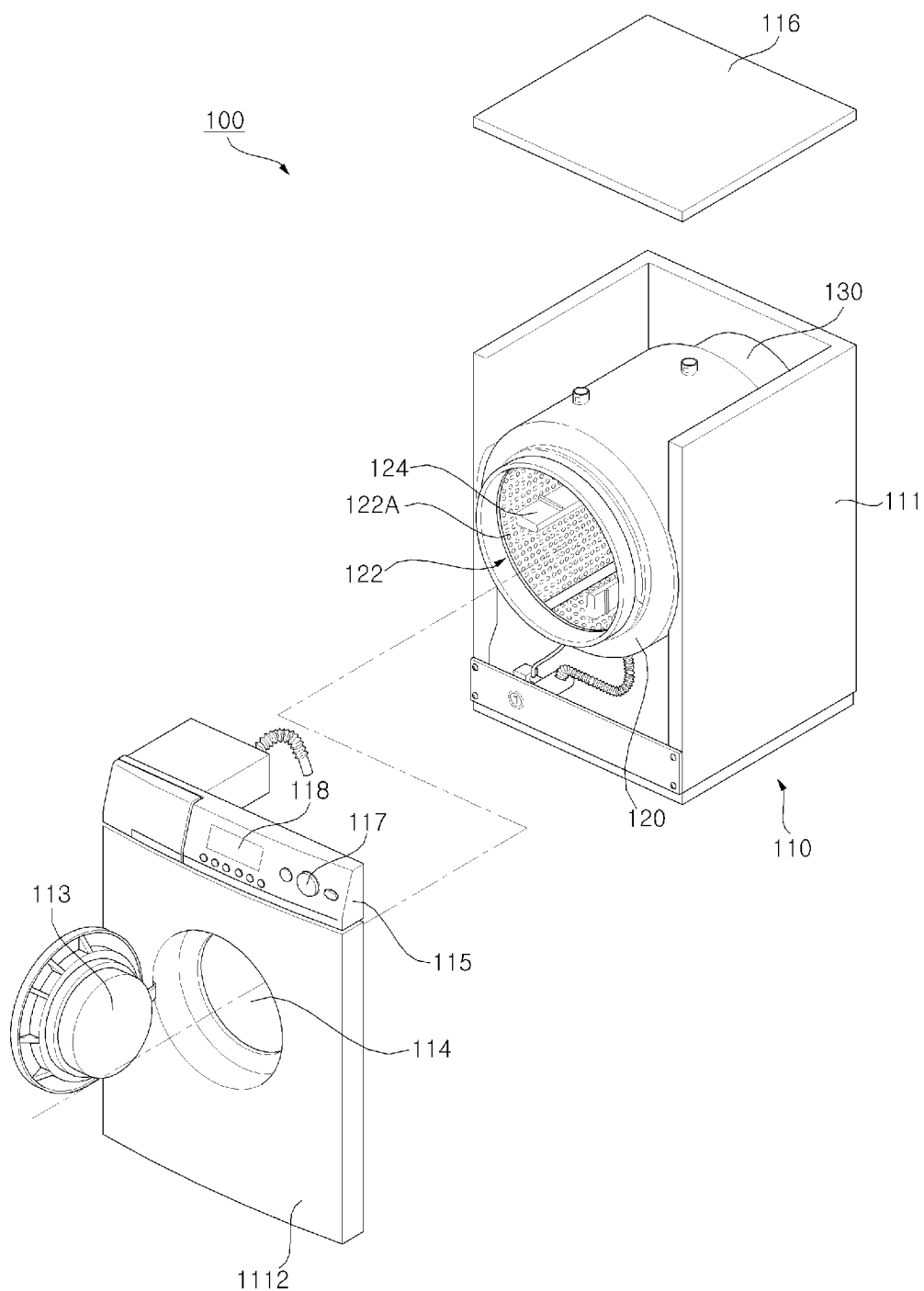
FIG. 1 is a perspective view illustrating a laundry treatment machine according to an embodiment of the present invention.

FIG. 1 is a perspective view illustrating a laundry treatment machine according to an embodiment of the present invention.

Referring to FIG. 1, a laundry treatment machine 100 according to an embodiment of the present invention may be a front load type laundry treatment machine in which cloth is loaded into a washing tub through the front thereof.

As shown in the drawing, the laundry treatment machine 100 may be a drum type laundry treatment machine which includes a casing 110 which forms the exterior of the laundry treatment machine 100, a washing tub 120 which is located inside the casing 110 and supported by the casing 110, a drum 122 which is provided to the inside of the washing tub 120, in which cloth is washed, a motor 230 which drives the drum 122, a washing water supply unit (not shown) which is provided outside a cabinet body 111 and supplies washing water to the inside of the casing 110, and a drainage unit (not shown) which is provided under the washing tub 120 and discharges washing water to the outside.

The drum 122 may have a plurality of through-holes 122A through which washing water passes. A lifter 124 may be provided to the inner side of the drum 122 such that laundry is lifted to a certain height when the drum 122 rotates and then dropped due to gravity.

The casing 110 may include the cabinet body 111, a cabinet cover 112 which is provided to the front of the cabinet body 111 and combined with the cabinet body 111, a control panel 115 which is provided to the upper side of the cabinet cover 112 and combined with the cabinet body 111, and a top plate 116 which is provided to the top of the control panel 115 and combined with the cabinet body 111.

The cabinet cover 112 may include a laundry entrance hole 114 through which laundry is loaded/unloaded, and a door 113 which is provided to be rotatable to the left and right such that the laundry entrance hole 114 can be open and closed.

The control panel 115 may include operation keys 117 for controlling an operation state of the laundry treatment machine 100 and a display 118 which is provided to one side of the operation keys 117 and displays an operation state of the laundry treatment machine 100.

The operation keys 117 and the display 118 disposed in the control panel 115 may be electrically connected to a controller (not shown) and the controller (not shown) may electrically control components of the laundry treatment machine 100. The operation of the controller (not shown) will be omitted with reference to the operation of a controller 210 shown of FIG. 5.

Meanwhile, The drum 122 may be provided with auto balance (not shown). The auto balance (not shown) may be used to reduce vibrations caused by the amount of eccentricity of the laundry accommodated in the drum 122, and may be implemented by liquid balance, ball balance, or the like.

Meanwhile, although not shown in the drawing, the laundry treatment machine 100 may further include a vibration sensor for measuring the vibration amount of the drum 122 or the vibration amount of the casing 110.

Meanwhile, the laundry treatment machine 100 of FIG. 1 may include a heating unit, and may perform a drying mode by the operation of the heating unit. Accordingly, the laundry treatment machine 100 of FIG. 1 may be referred to as a dryer.

Figure 2A:
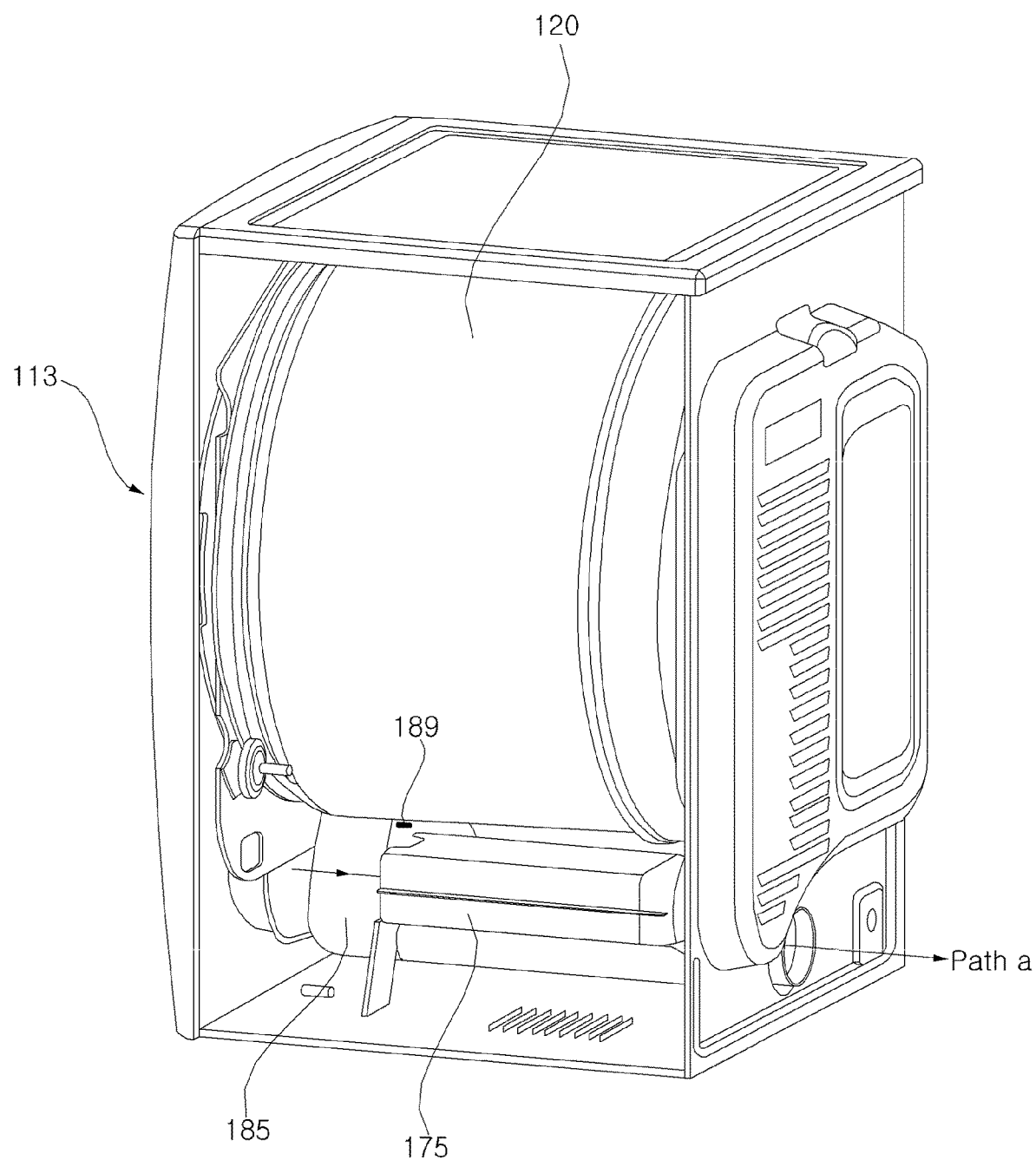
FIG. 2A is an example of a side view of the laundry treatment machine of FIG. 1.

FIG. 2A is an example of a side view of the laundry treatment machine of FIG. 1.

Referring to the drawings, the laundry treatment machine 100 may include a blower 185 and a heating unit 175 sequentially disposed along a path which is the opposite direction of the door 113.

The blower 185 may supply air to the washing tub 120. To this end, the blower 185 may include a blowing fan and a blowing motor for driving the blowing fan.

The heating unit 175 may heat the air supplied to the washing tub 120. To this end, the heating unit 175 may be disposed between the blower 185 and the rear surface of the washing tub 120.

Meanwhile, a temperature detector 189 may be attached to the blower 185. Particularly, it may be attached to the rear end of the blower 185 to detect the exhaust temperature of the washing tub 120.

Meanwhile, the temperature detector 189 may include a thermistor.

Figure 2B:
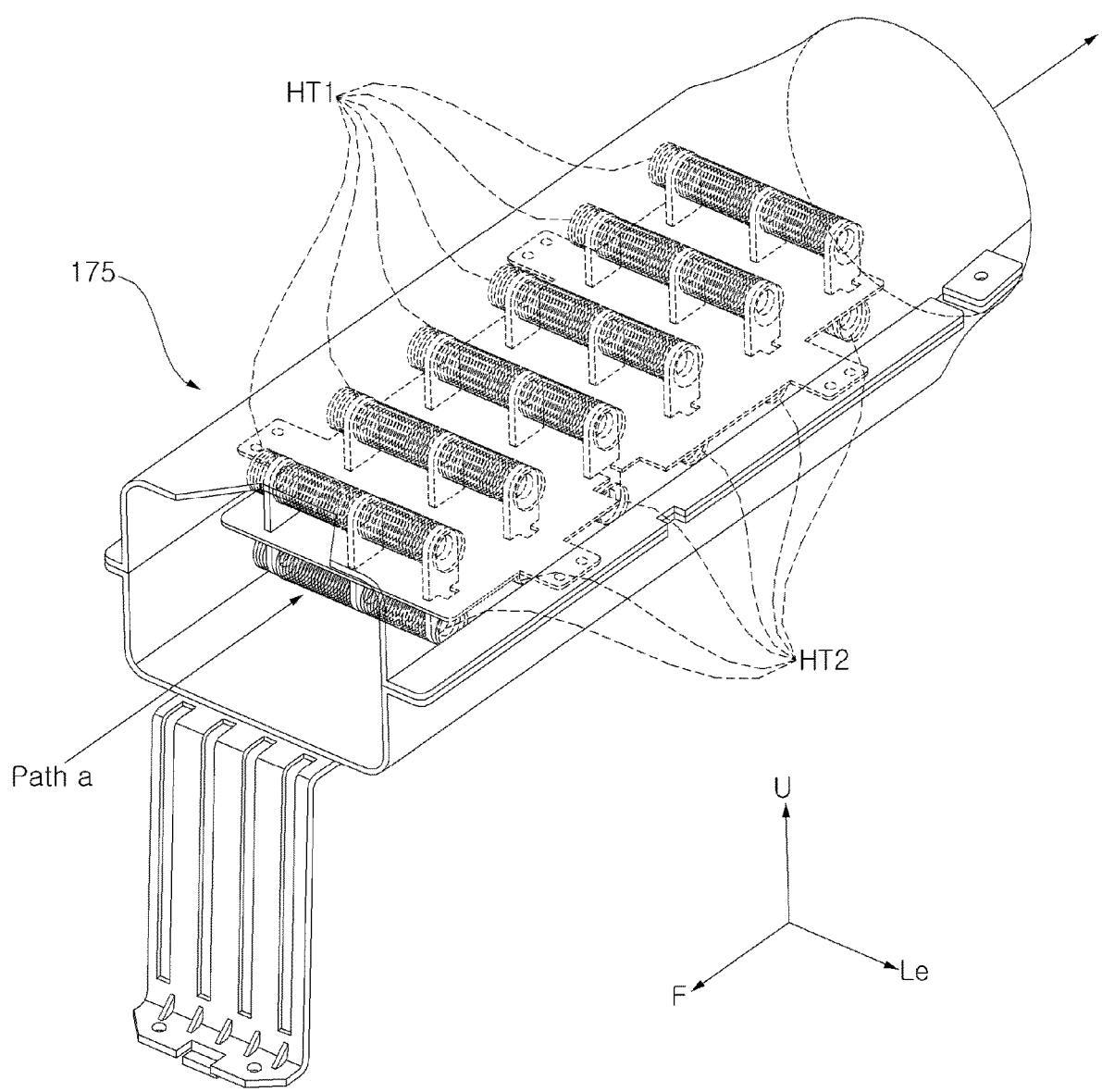
FIG. 2B is an example of an internal structure of the heating unit of FIG. 2A.

FIG. 2B is an example of the internal structure of the heating unit of FIG. 2A.

Referring to the drawings, the heating unit 175 may output a plurality of heating powers. To this end, the heating unit 175 may include a first heater HT1 and a second heater HT2.

Meanwhile, the first heater HT1 and the second heater HT2 may include a plurality of heating units respectively.

In the drawing, it is illustrated that the first heater HT1 having a plurality of heating units is disposed on an upper portion of the second heater HT2 having a plurality of heating units.

For example, in order to output a first power, the first heater HT1 and the second heater HT2 in the heating unit 175 may operate.

As another example, either the first heater HT1 or the second heater HT2 in the heating unit 175 may operate in order to output a second power which is lower than the first power.

Figure 3:
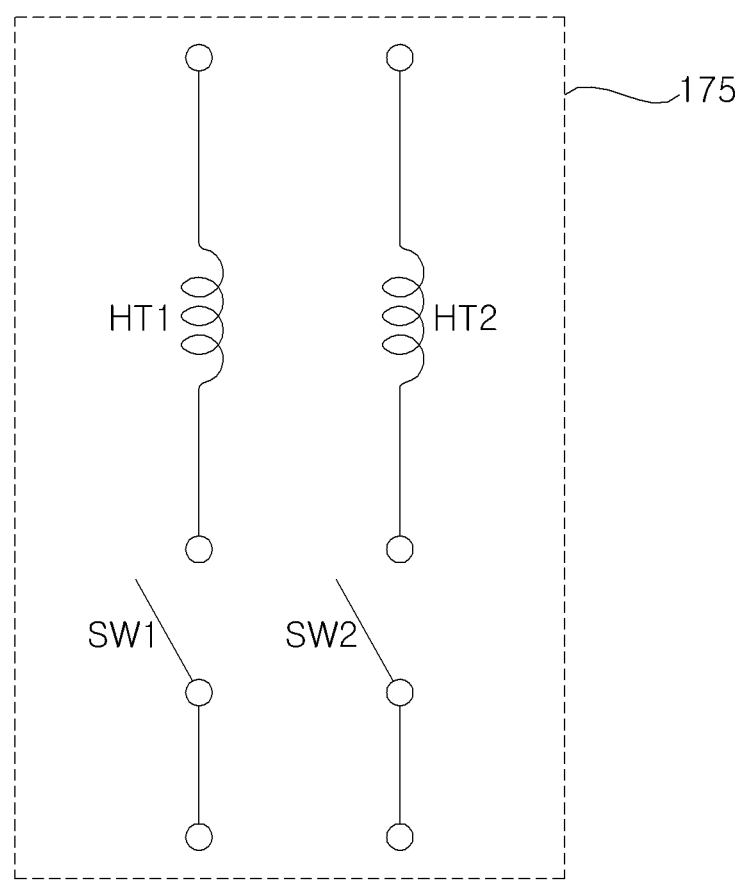
FIG. 3 is an example of a circuit diagram of the heating unit of FIG. 2B.

FIG. 3 is an example of a circuit diagram of the heating unit of FIG. 2B.

Referring to the drawings, the heating unit 175 may include the first heater HT1, the second heater HT2, and a first switching element SW1 and a second switching element SW2 which are connected to the first heater HT1 and the second heater HT2 respectively to perform a switching.

For example, in order to output the first power, both the first switching element SW1 and the second switching element SW2 may be turned on. Thus, the first heater HT1 and the second heater HT2 inside the heating unit 175 may be operated.

As another example, in order to output the second power output which is lower than the first power, one of the first switching element SW1 and the second switching element SW2 may be turned on, and the other may be turned off. Thus, either the first heater HT1 or the second heater HT2 inside the heating unit 175 may operate.

Meanwhile, the heating powers of the first heater HT1 and the second heater HT2 may be the same. For example, it may be 2700 W.

Accordingly, when both the first heater HT1 and the second heater HT2 operate, the first power of 5400 W may be output.

Meanwhile, when either the first heater HT1 or the second heater HT2 is operated, the second power of 2700 W smaller than the first power may be output.

Figure 4:
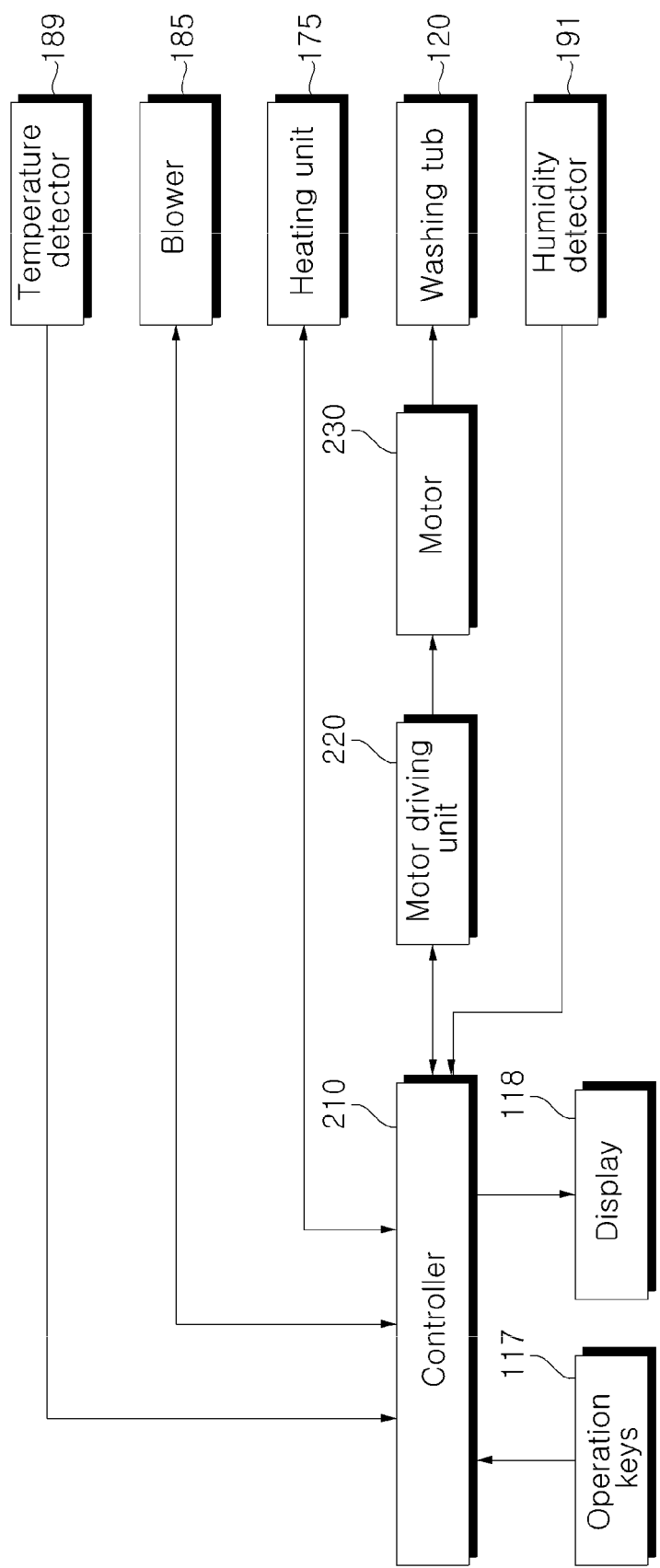
FIG. 4 is an internal block diagram of the laundry treatment machine of FIG. 1.

FIG. 4 is an internal block diagram of the laundry treatment machine of FIG. 1.

Referring to FIG. 4, the laundry treatment machine 100 may include the motor 230 for rotating the washing tub 120, a motor driving unit 220 for driving the motor 230, a communication unit 270, the operation key 117, the display 118, the controller 210 for controlling each unit inside the laundry treatment machine 100, the temperature detector 189, the blower 185, the heating unit 175, and a humidity detector 191.

In particular, the controller 210 may control the motor driving unit 220.

The laundry treatment machine 100 may be controlled by a control operation of the controller 210. In particular, the controller 210 may control the motor driving unit 220.

The motor driving unit 220 may drive the motor 230. Thus, the washing machine 120 may be rotated by the motor 230.

The controller 210 may receive an operation signal from the operation key 117 and control various operations. Accordingly, washing, rinsing, and dehydration may be performed.

The controller 210 may control the display 118 to display a wash course, a wash time, a dehydration time, a rinsing time, a current operation state, or the like.

Meanwhile, the controller 210 may control the motor driving unit 220 and the motor driving unit 220 may control the motor 230 to operate. At this time, a position detector for detection the position of a rotor of the motor is not provided inside or outside the motor 230. That is, the motor driving unit 220 may control the motor 230 by a sensorless method.

The motor driving unit 220 may be implemented to drive the motor 230, and may include an inverter (not shown), an inverter controller (not shown), and an output current detector (E of FIG. 5) for detecting an output current flowing through the motor 230. Further, the motor driving unit 220 may further include a converter or the like that supplies a DC power inputted to the inverter (not shown).

For example, the inverter controller (430 of FIG. 5) in the motor driving unit 220 may estimate the position of the rotor of the motor 230, based on the output current io. Then, the motor 230 may be controlled to rotate, based on the estimated rotor position.

Specifically, the inverter controller (430 of FIG. 5) may generate a switching control signal (Sic of FIG. 5) of a pulse width modulation (PWM) method based on the output current io and output the switching control signal (Sic of FIG. 5) to the inverter, so that the inverter (not shown) performs a high-speed switching operation and supplies an AC power of a variable frequency to the motor 230. Then, the motor 230 may be rotated by the AC power of a variable frequency.

The motor driving unit 220 will be described later with reference to FIG. 5.

Meanwhile, the controller 210 may detect the amount of laundry, based on the current io detected by the current detector. For example, it may detect the amount of laundry based on the current value io of the motor 230, while the washing tub 120 rotates.

Meanwhile, the controller 210 may detect the amount of eccentricity of the washing tub 120, that is, the unbalance (UB) of the washing tub 120. Such eccentricity detection may be performed based on the ripple component of the current io detected by the current detector or the rotation speed variation amount of the washing tub 120.

The temperature detector 189 may detect the temperature in the washing tub 120. In particular, the temperature detector 189 may detect the exhaust temperature of the washing tub 120.

Depending on the drying mode, when the blower 185 operates or both the blower 185 and the heating unit 175 operate, the temperature detector 189 may detect the exhaust temperature of the washing tub 120. The detected temperature information may be transmitted to the controller 210.

The blower 185 may supply air to the washing tub 120. To this end, the blower 185 may include the blowing fan and the blowing motor for driving the blowing fan.

The heating unit 175 may heat the air supplied to the washing tub 120. The heating unit 175 may be provided together with the blower 185, or may be disposed between the blower 185 and the washing tub 120.

Meanwhile, the heating unit 175 may output a plurality of heating powers. To this end, the heating unit 175 may include the first heater HT1 and the second heater HT2.

For example, in order to output the first power, the first heater HT1 and the second heater HT2 in the heating unit 175 may operate.

As another example, one of the first heater HT1 and the second heater HT2 in the heating unit 175 may operate in order to output the second power lower than the first power.

The humidity detector 191 may detect the humidity in the washing tub 120. For example, the humidity detector 191 may include an electrode member for detection humidity, and may detect humidity based on a level detected by the electrode member. Meanwhile, the humidity information detected by the humidity detector 191 may be transmitted to the controller 210.

The controller 210 may control the blower 185, the heating unit 175, and the like to operate, according to the drying mode.

Meanwhile, the drying mode may be divided into an eco drying mode and a normal drying mode.

The eco drying mode may represent a mode of performing drying while reducing power consumption, and the normal drying mode may represent a mode of performing drying regardless of power consumption.

According to an embodiment of the present invention, in the case of a first drying mode which is the eco drying mode, the controller 210 may operate the blower 185 and control the heating unit 175 to output the first power intermittently during a first period after operating the blower 185, and may control to increase the operation time of the heating unit 175.

Meanwhile, in the first drying mode, the controller 210 may control the heating unit 175 to be repeatedly turned on and off during a first interval to a third interval of the first period, and may control a turned-on period of the heating unit 175 to increase as it proceeds from the first interval to the third interval.

Meanwhile, in the first drying mode, after the first period, when the temperature detected by the temperature detector 189 is equal to or lower than a first reference value, the controller 210 may control the heating unit 175 to continuously output the first power during a second period.

Meanwhile, the controller 210 may control both the first heater HT1 and the second heater HT2 to operate, during the first period and the second period.

Meanwhile, in the first drying mode, during a third period after the second period, the controller 210 may control the heating unit 175 to alternately output the first power and the second power, and may control the heating unit 175 to output the first power, during a fourth period after the third period.

Meanwhile, in the first drying mode, after the first period, when the temperature detected by the temperature detector 189 exceeds the first reference value, the controller 210 may control the heating unit 175 to continuously output the second power lower than the first power during the second period.

Meanwhile, the controller 210 may control both the first heater HT1 and the second heater HT2 to operate during the first period, and may control one of the first heater HT1 and the second heater HT2 to operate during the second period.

Meanwhile, in the first drying mode, the controller 210 may control the heating unit 175 to alternately output the first power and the second power, after the second period during the third period, and may control the heating unit 175 to output the first power, during the fourth period after the third period.

Meanwhile, in the first drying mode, when the humidity of the washing tub 120 is equal to or lower than a first reference humidity, and the operation time of the first drying mode is within a second reference value, the controller 210 may control the heating unit 175 to be turned off.

Meanwhile, in the first drying mode, after the heating unit 175 is turned off, when the humidity of the washing tub 120 is equal to or lower than a second reference humidity lower than the first reference humidity, the controller 210 may control the blower 185 to be turned off.

Meanwhile, in the first drying mode, during the first interval to the third interval of the first period, the controller 210 may control the turned-on period of the heating unit 175 to increase in proportion to the amount of laundry in the washing tub 120.

Meanwhile, in the case of the first drying mode, the controller 210 may control the first period and the second period to increase, in proportion to the amount of laundry in the washing tub 120.

Meanwhile, in the case of a second drying mode, the controller 210 may control the heating unit 175 to continuously output the first power during the fourth period. After the output of the first power, the controller 210 may control the heating unit 175 to continuously output the second power lower than the first power during a fifth period. After the output of the second power, the controller 210 may control the heating unit 175 to continuously output the first power during a sixth period.

Meanwhile, according to another embodiment of the present invention, in the case of the first drying mode which is the eco drying mode, the controller 210 may control the power outputted from the heating unit 175 to sequentially increase during the first period, and may control the power outputted from the heating unit 175 to be constant during the second period.

Figure 5:
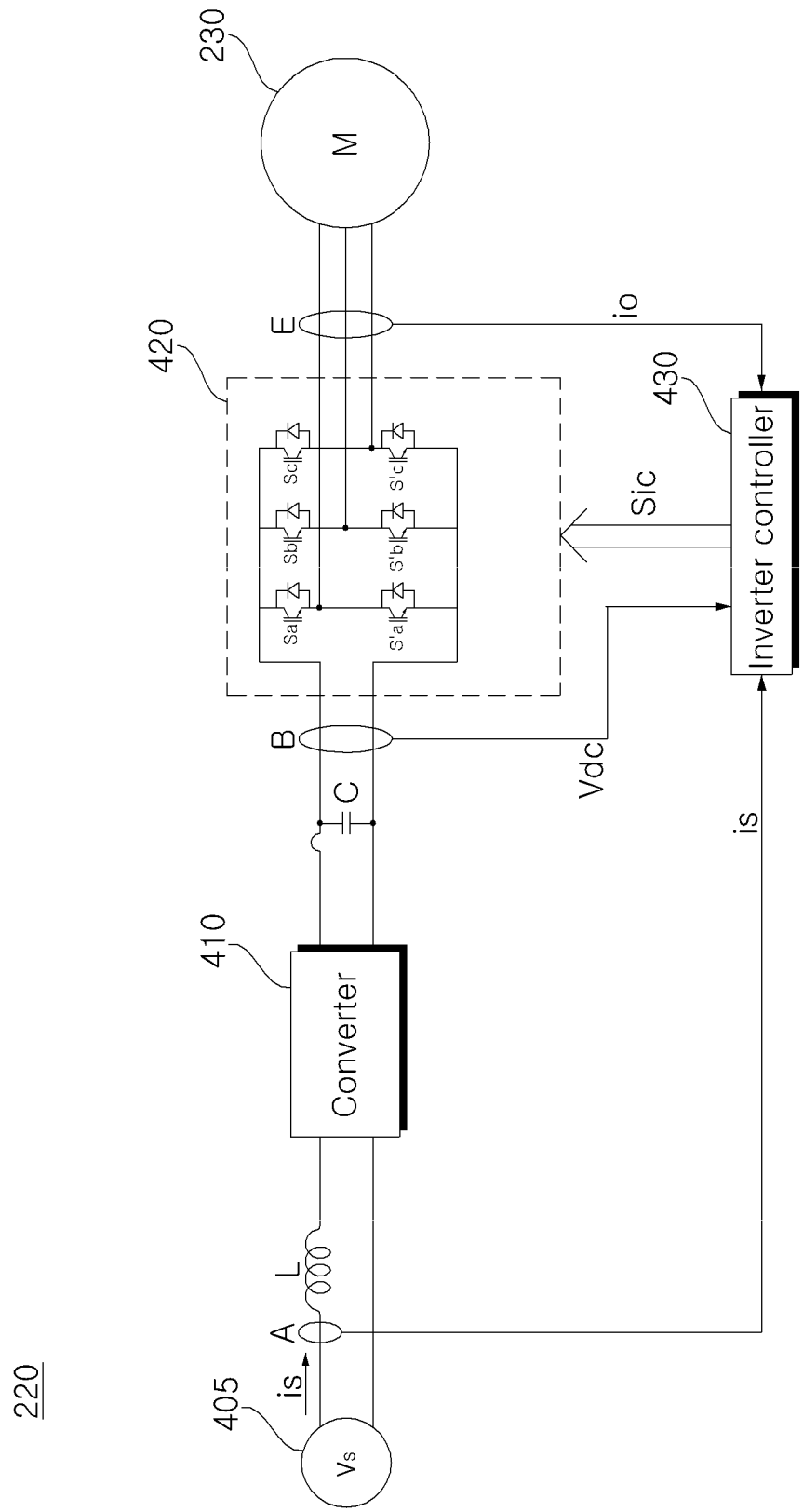
FIG. 5 is an internal circuit diagram of the motor driving unit of FIG. 4.

FIG. 5 is an internal circuit diagram of the motor driving unit of FIG. 4.

Referring to FIG. 4, the motor driving unit 220 according to an embodiment of the present invention may be implemented to drive a motor of sensorless type, and may include a converter 410, an inverter 420, an inverter controller 430, a DC end voltage detector B, a smoothing capacitor C, an output current detector E, and an output voltage detector F. In addition, the motor driving unit 220 may further include an input current detector A, a reactor L, and the like.

The reactor L may be disposed between a commercial AC power 405 and the converter 410 to perform a power factor correction or a boosting operation. In addition, the reactor L may serve to restrict a harmonic current due to a fast switching of the converter 410.

The input current detector A may detect an input current ($i_s$) inputted from the commercial AC power 405. To this end, a current transformer (CT), a shunt resistor, or the like may be used as the input current detector A. The detected input current $i_s$ may be inputted to the inverter controller 430 as a discrete signal in the form of a pulse.

The converter 410 may convert the commercial AC power 405, which passed through the reactor L, into a DC power and output the DC power. Although the commercial AC power 405 is shown as a single-phase AC power in the figure, it may be a three-phase AC power. The internal structure of the converter 410 may be changed depending on the type of the commercial AC power 405.

Meanwhile, the converter 410 may be formed of a diode or the like without a switching element, and may perform a rectification operation without a separate switching operation.

For example, in the case of a single-phase AC power, four diodes may be used in the form of a bridge, and in the case of a three-phase AC power, six diodes may be used in the form of a bridge.

Meanwhile, as the converter 410, for example, a half-bridge type converter in which two switching elements and four diodes are connected may be used, and in the case of a three-phase AC power, six switching elements and six diodes may be used.

When the converter 410 includes a switching element, it is possible to perform the boosting operation, the power factor correction, and the DC power conversion by the switching operation of a corresponding switching element.

The smoothing capacitor C may smooth and store the inputted power. In the figure, a single element is illustrated as the smoothing capacitor C, but a plurality of elements may be provided to secure an element stability.

Meanwhile, in the figure, it is illustrated that the smoothing capacitor C is connected to the output end of the converter 410. However, the present invention is not limited thereto, and a DC power may be directly inputted. For example, the DC power from a solar cell may be supplied directly to the smoothing capacitor C or may be DC/DC converted and inputted. Hereinafter, a portion illustrated in the drawing is mainly described.

Meanwhile, since both ends of the smoothing capacitor C stores the dc power, it may be referred to as a DC end or a DC link end.

The DC end voltage detector B may detect the voltage Vdc of the DC end which is both ends of the smoothing capacitor C. To this end, the DC end voltage detector B may include a resistance element, an amplifier, and the like. The detected DC end voltage (Vdc) may be inputted to the inverter controller 430 as a discrete signal in the form of a pulse.

The inverter 420 may include a plurality of inverter switching elements, and may convert the DC power Vdc smoothed by the turned-on/off operation of the switching element into a three-phase AC power va, vb, vc of a certain frequency and output it to the three-phase synchronous motor 230.

In the inverter 420, an upper arm switching element Sa, Sb, Sc and a lower arm switching element S'a, S'b, S'c which are connected in series to each other may form a pair, and total three pairs of upper arm and lower arm switching elements may be connected in parallel Sa&S'a, Sb&S'b, Sc&S'c with each other. Diodes may be connected in anti-parallel to each switching element Sa, S'a, Sb, S'b, Sc, S'c.

The switching elements in the inverter 420 may perform the turned-on/off operation of respective switching elements based on an inverter switching control signal Sic applied from the inverter controller 430. Thus, the three-phase AC power having ae certain frequency may be outputted to the three-phase synchronous motor 230.

The inverter controller 430 may control the switching operation of the inverter 420 based on a sensorless method. To this end, the inverter controller 430 may receive an output current io detected by the output current detector E and an output voltage Vo detected by the output voltage detector F.

The inverter controller 430 may output the inverter switching control signal Sic to the inverter 420 so as to control the switching operation of the inverter 420. The inverter switching control signal Sic may be a switching control signal of a pulse width modulation method (PWM), and may be generated and outputted based on the output current io detected by the output current detector E and the output voltage vo detected by the output voltage detector F. Detailed operation of the output of the inverter switching control signal Sic in the inverter controller 430 will be described later with reference to FIG. 6.

The output current detector E may detect the output current io flowing between the inverter 420 and the three-phase motor 230. That is, the output current detector E may detect the current flowing in the motor 230. The output current detector E may detect all the output currents ia, ib, is of each phase, or may detect the output currents of two phases by using the three-phase balance.

The output current detector E may be located between the inverter 420 and the motor 230. A current transformer (CT), a shunt resistor, or the like may be used so as to detect current.

When the shunt resistor is used, three shunt resistors may be located between the inverter 420 and the synchronous motor 230, or one end thereof may be connected to three lower arm switching elements S'a, S'b, S'c respectively. Meanwhile, two shunt resistors may be used by using three phase equilibrium. Meanwhile, when a single shunt resistor is used, a corresponding shunt resistor may be disposed between the capacitor C and the inverter 420.

The detected output current io may be, as a discrete signal in the form of a pulse, applied to the inverter controller 430, and the inverter switching control signal Sic may be generated based on the detected output current io. Hereinafter, it may be described that the detected output current io is the three-phase output current ia, ib, ic.

Meanwhile, the three-phase motor 230 may have a stator and a rotor, and each phase alternating current power of a certain frequency may be applied to a coil of a stator of each phase (a, b, c phase), so that the rotor rotates.

The motor 230 may include, for example, a Surface Mounted Permanent Magnet Synchronous Motor (SMPMSM), an Interior Permanent Magnet Synchronous Motor (IPMSM), a Synchronous Reluctance Motor (Synrm), and the like. Among them, SMPMSM and IPMSM are a Permanent Magnet Synchronous Motor (PMSM), and Synrm has no permanent magnet.

Meanwhile, the inverter controller 430 may control the switching operation of the switching element in the converter 410, when the converter 410 includes the switching element. To this end, the inverter controller 430 may receive the input current $i_s$ detected by the input current detector A. The inverter controller 430 may output the converter switching control signal Scc to the converter 410 to control the switching operation of the converter 410. This converter switching control signal Scc may be a switching control signal of a pulse width modulation (PWM) method, and may be generated based on the input current $i_s$ detected by the input current detector A.

Figure 6:
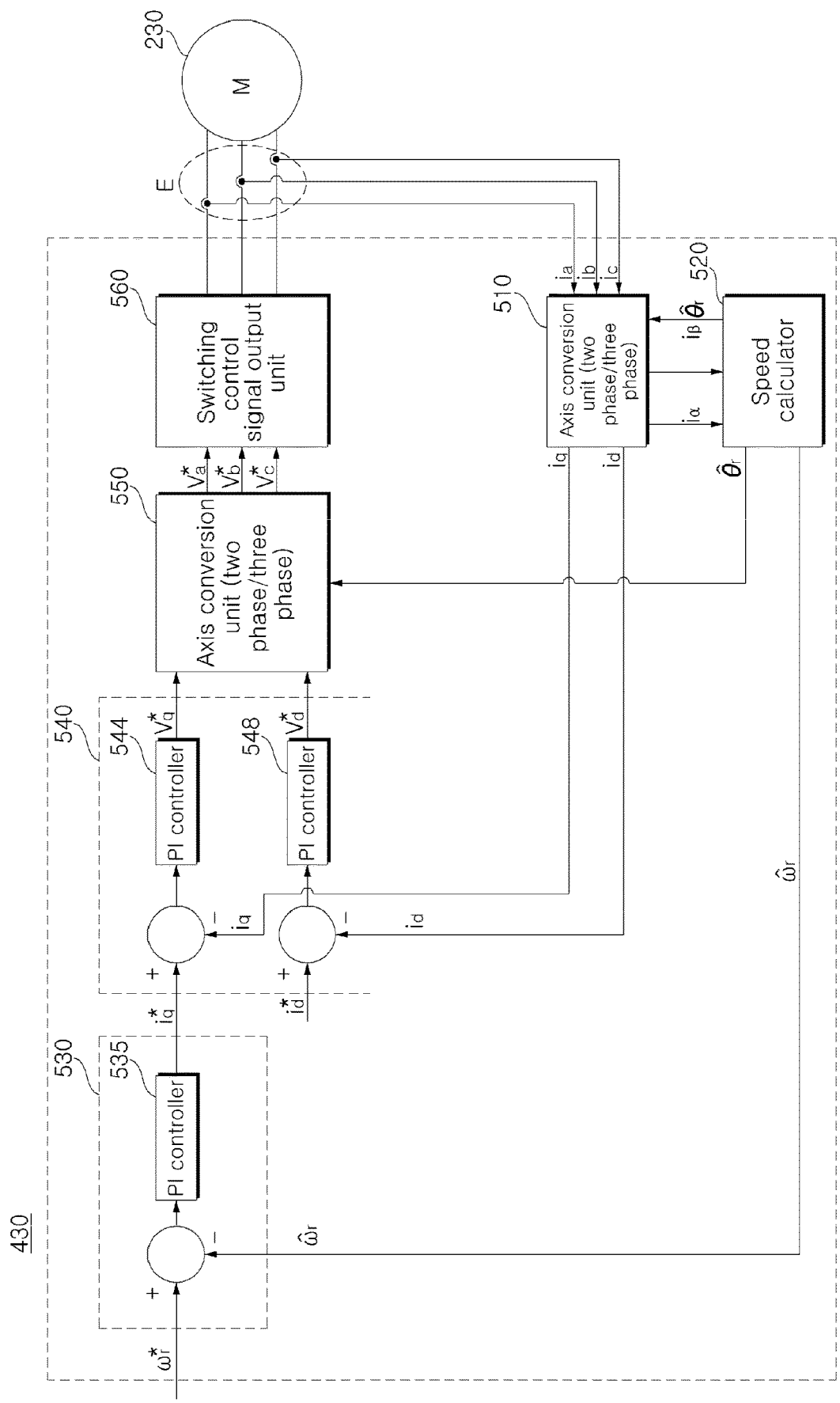
FIG. 6 is an internal block diagram of an inverter controller of FIG. 5.

FIG. 6 is an internal block diagram of an inverter controller of FIG. 5.

Referring to FIG. 6, the inverter controller 430 may include an axis conversion unit 510, a speed calculator 520, a current command generator 530, a voltage command generator 540, an axis conversion unit 550, and a switching control signal output unit 560.

The axis conversion unit 510 may receive the output current ia, ib, ic detected by the output current detector E, and convert the output current ia, ib, ic into a two-phase current iα, iβ in a stationary coordinate system and into a two-phase current id, iq in a rotational coordinate system.

Meanwhile, the axis conversion unit 510 may output the two-phase current iα, iβ of the stationary coordinate system, the two-phase voltage vα, vβ of the stationary coordinate system, the two-phase current id, iq of the rotational coordinate system, and the two-phase voltage vd, vq of the rotational coordinate system, which are converted, to the outside.

The speed calculator 520 may receive the two-phase current iα, iβ of the stationary coordinate system, and the two-phase voltage vα, vβ of the stationary coordinate system, which are axis-converted, from the axis conversion unit 510, so that the rotor position (θ) and the speed (ω) of the motor 230 can be calculated.

Meanwhile, the current command generator 530 may generate a current command value $i^*_q$, based on the calculated speed $\hat{\omega}$ and a speed command value $\omega^*_r$. For example, the current command generator 530 may perform a PI control in a PI controller 535, based on a difference between the calculated speed $\hat{\omega}$ and the speed command value $\omega^*_r$, and generate the current command value $i^*_q$. Although the q-axis current command value $i^*_q$ is exemplified as the current command value in the drawing, a d-axis current command value $i^*_d$ may be generated along with the q-axis current command value $i^*_q$ unlike the drawing. Meanwhile, the d-axis current command value $i^*_d$ may be set to 0.

Meanwhile, the current command generator 530 may further include a limiter (not shown) that limits the level of the current command value $i^*_q$ such that the level does not exceed an allowable range.

Then, the voltage command generator 540 may generate d-axis and q-axis voltage command values $v^*_d$ and $v^*_q$, based on the d-axis and q-axis currents $i_d$ and $i_q$, which are converged into the two-phase rotational coordinate system by the axis conversion unit, and the current command values $i^*_d$ and $i^*_q$ generated by the current command generator 530. For example, the voltage command generator 540 may perform the PI control in a PI controller 544, based on a difference between the q-axis current $i_q$ and the q-axis current command value $i^*_q$, and generate the q-axis voltage command value $v^*_q$. In addition, the voltage command generator 540 may perform PI control in a PI controller 548, based on a difference between the d-axis current $i_d$ and the d-axis current command value $i^*_d$, and generate the d-axis voltage command value $v^*_d$. Meanwhile, the d-axis voltage command value $v^*_d$ may be set to 0, corresponding to the case where the d-axis current command value $i^*_d$ is set to 0.

Meanwhile, the voltage command generator 540 may further include a limiter (not shown) that limits the levels of the d-axis and a-axis voltage command values $v^*_d$ and $v^*_q$ such that the levels do not exceed allowable ranges.

Meanwhile, the generated d-axis and q-axis voltage command values $v^*_d$ and $v^*_q$ may be inputted to the axis conversion unit 550.

The axis conversion unit 550 may receive the calculation position $\hat{\theta}_r$ and the d-axis and q-axis voltage command values $v^*_d$ and $v^*_q$ from the speed calculator 520, and perform the axis conversion.

First, the axis conversion unit 550 may performs conversion from a two-phase rotational coordinate system to a two-phase stationary coordinate system. At this time, the calculation position ($\hat{\theta}_r$) may be used in the speed calculator 520.

Then, the axis conversion unit 550 may perform conversion from a two-phase stationary coordinate system to a three-phase stationary coordinate system. The axis conversion unit 550 may output three-phase output voltage command values v*a, v*b, v*c through such transformation.

The switching control signal output unit 560 may generate the PWM inverter switching control signal Sic, based on the three-phase output voltage command values v*a, v*b, v*c.

The inverter switching control signal Sic output from the switching control signal output unit 560 may be converted into a gate driving signal in a gate driver (not shown) and applied to a gate of each switching element included in the inverter 420. Accordingly, the switching elements Sa, S'a, Sb, S'b, Sc, may perform switching operations.

Figure 7A:
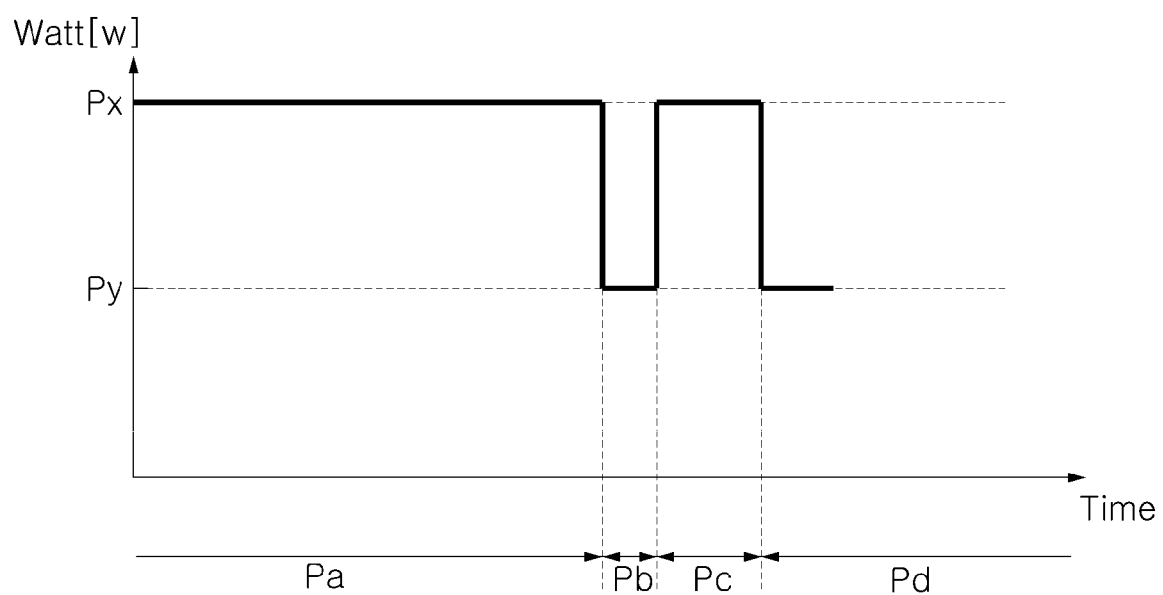
FIG. 7A and FIG. 7B are diagrams illustrating various examples of an operation method of the heating unit of FIG. 4.
Figure 7B:
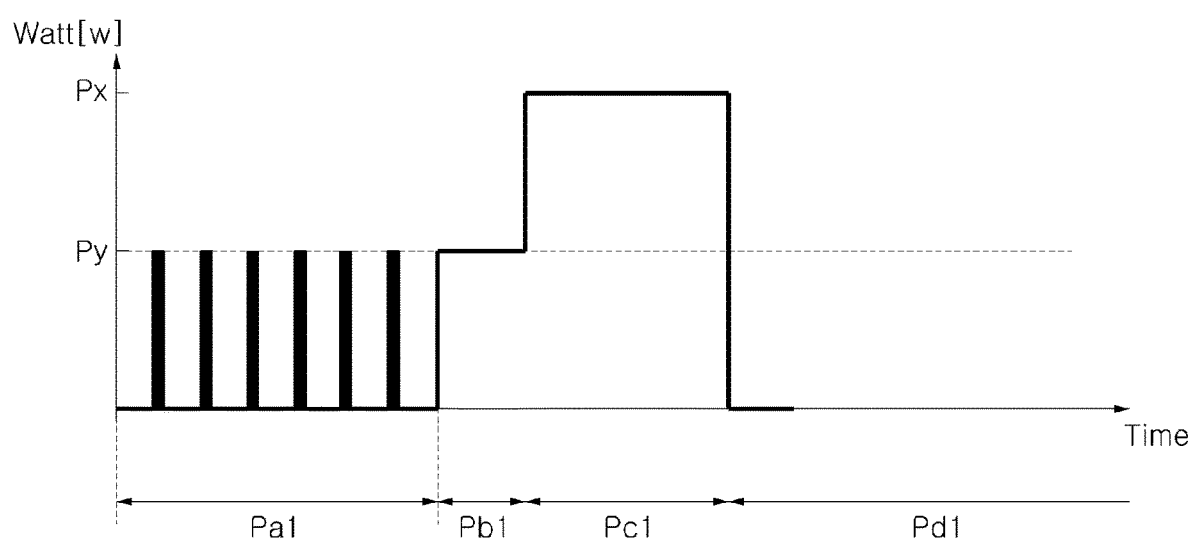

FIG. 7A and FIG. 7B are diagrams illustrating various examples of an operation method of the heating unit of FIG. 4.

First, FIG. 7A is a diagram illustrating the operation of the heating unit 175 in the normal drying mode which is the second drying mode.

Referring to the drawing, in the second drying mode, the controller 210 may control the heating unit 175 to continuously output a first power Px during a period Pa. After outputting the first power, the controller 210 may control the heating unit 175 to continuously output a second power Py lower than the first power Px during a period Pb. After outputting the second power, the controller 210 may control the heating unit 175 to continuously output again the first power Px during a period Pc.

Meanwhile, the controller 210 may control the heating unit 175 to continuously output the second power Py, during a period Pd after the period Pc. Then, the controller 210 may stop the operation of the heating unit 175 after the period Pd.

The second drying mode may be performed when the amount of the laundry is equal to or smaller than a certain value, through the detection of the amount of laundry in the washing tub 120. As described above, since the amount of the laundry in the washing tub 120 is small, the power consumption may be reduced and the drying period may be shortened.

Next, FIG. 7B is a diagram illustrating the operation of the heating unit 175 in the eco drying mode which is the first drying mode.

Referring to the drawing, in the eco dry mode which is the first drying mode, the controller 210 may control the heating unit 175 to intermittently output the second power Py, during a period Pa1, as a preheating period.

Then, the controller 210 may control the heating unit 175 to continuously output the second power Py during a period Pb1, and may control the heating unit 175 to continuously output the first power Px higher than the second power Py during a period Pc1.

Meanwhile, the eco drying mode, which is the first drying mode, may be performed by user input.

Alternatively, the eco drying mode, which is the first drying mode, may be performed to reduce power consumption when the amount of the laundry exceeds a certain value.

Meanwhile, in order to reduce the power consumption, when the eco drying mode which is the first drying mode is performed as shown in FIG. 7B, the power consumption may be reduced, but the drying period may be increased. In particular, the drying period may be increased by approximately 30% to 50% in comparison with the drying period of FIG. 7A.

Therefore, the present invention suggests an eco drying mode in which power consumption is reduced while shortening the drying period. This will be described with reference to FIG. 8.

Figure 8:
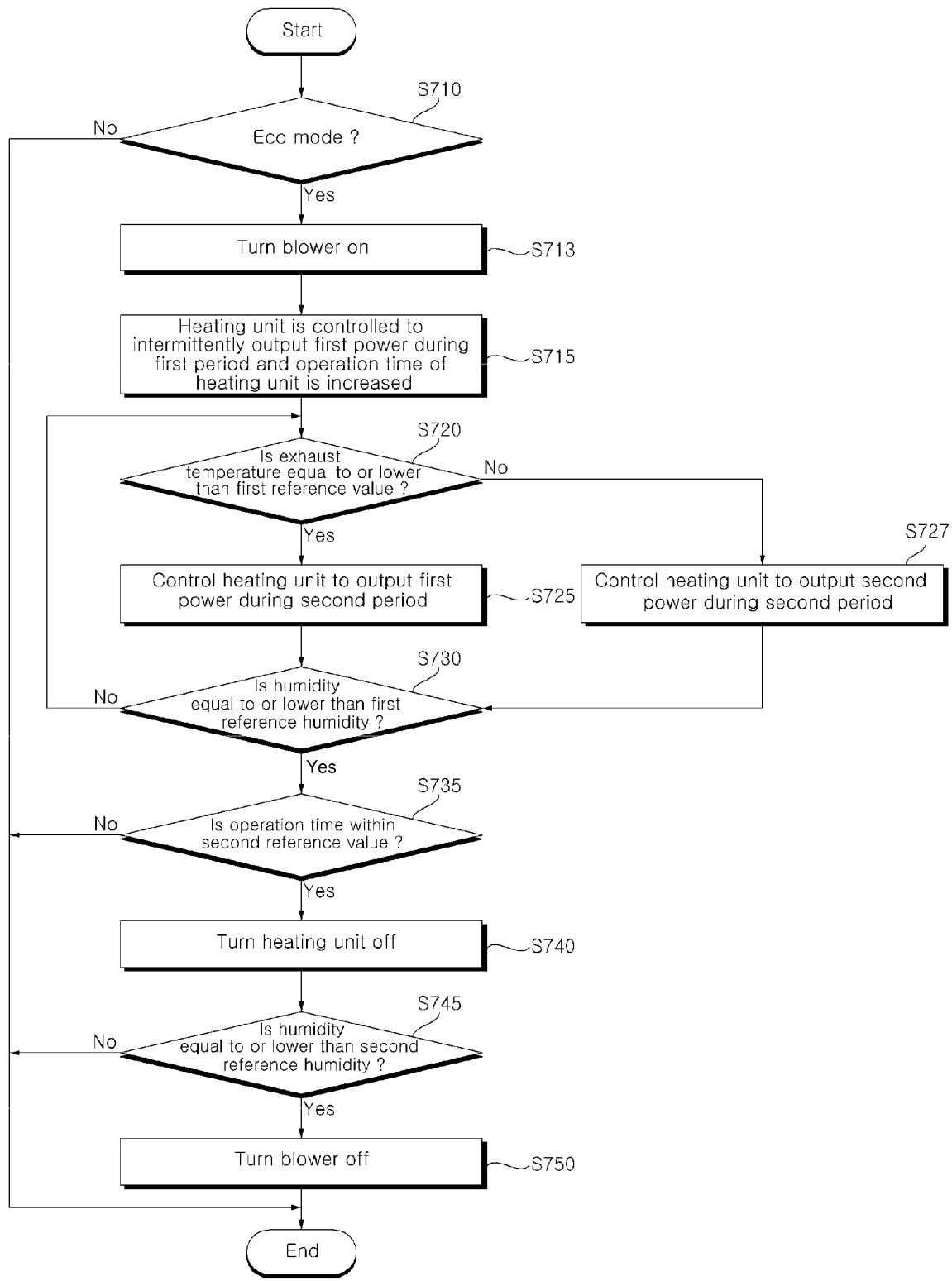
FIG. 8 is a flowchart illustrating an operation method of a laundry treatment machine according to an embodiment of the present invention.
Figure 9:
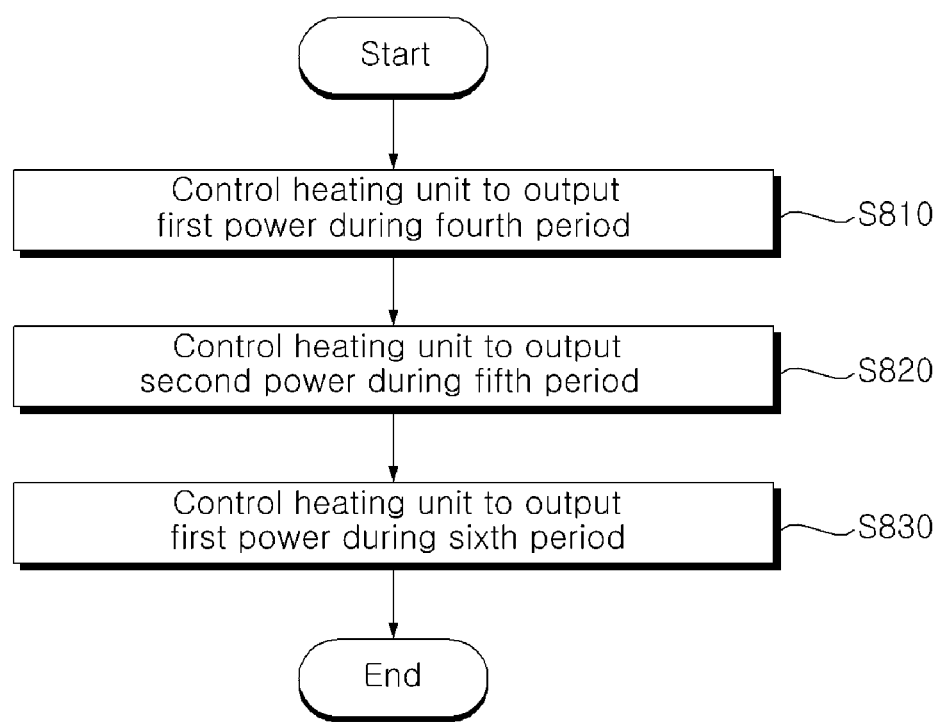
FIG. 9 to FIG. 11B are diagrams for explaining the operation method of FIG. 8.

FIG. 8 is a flowchart illustrating an operation method of a laundry treatment machine according to an embodiment of the present invention, and FIG. 9 to FIG. 11B are diagrams for explaining the operation method of FIG. 8.

First, the controller 210 of the laundry treatment machine 100 may determine whether it is the eco drying mode which is the first drying mode (S710).

The eco drying mode, which is the first drying mode, may be performed according to user input.

Alternatively, the eco drying mode, which is the first drying mode, may be performed to reduce power consumption, when the amount of the laundry exceeds a certain value, after detecting the amount of the laundry.

Meanwhile, the controller 210 of the laundry treatment machine 100 may control to perform the normal drying mode which is the second drying mode so as to achieve a quick drying, as it is not necessary to reduce the power consumption when the detected amount of the laundry is equal to or less than the certain value.

The normal drying mode, which is the second drying mode, may be performed as shown in FIG. 7A.

In addition, FIG. 8 is a flowchart for describing the normal drying mode which is the second drying mode.

Referring to FIG. 8, in the second drying mode, the controller 210 may control the heating unit 175 to continuously output the first power during the fourth period (S810), control the heating unit 175 to continuously output the second power lower than the first power during a fifth period, after outputting the first power (S820), and may control the heating unit 175 to continuously output the first power during a sixth period, after outputting the second power (S830). Thus, rapid drying may be performed.

Next, the controller 210 of the laundry treatment machine 100 may control the blower 185 to operate, in order to perform the first drying mode (S713).

FIG. 10A to FIG. 10F illustrate that, during the period P0, only the blower 195 operates while not operating the heating unit 175.

Such a case may be named air drying.

Meanwhile, the controller 210 of the laundry treatment machine 100 may control the washing tub 120 to rotate at a constant speed so as to loosening the laundry in the washing tub 120, during the period P0.

Next, the controller 210 of the laundry treatment machine 100 may control the heating unit 175 to intermittently output the first power Px during the first period P1 after the operation of the blower 185, and control the operation time of the heating unit 175 to increase (S715).

FIG. 10A to FIG. 10F illustrate the operation of the blower 195 and the heating unit 175 during the period P1.

In particular, FIG. 10A to FIG. 10F illustrate that, during the first period P1, the heating unit 175 is controlled to output the first power Px intermittently, and the operation time of the heating unit 175 is increased.

The first period P1 may be a preheating period and may be divided into a plurality of periods.

FIG. 10A to FIG. 10F illustrate that the first period P1 includes a first interval to a third interval (P1a to P1c).

Meanwhile, the controller 210 may control the heating unit 175 to be repeatedly turned on and off during the first interval to third interval (P1a to P1c). In particular, the turned-on period of the heating unit 175 may be controlled to increase, as it proceeds from the first interval P1a toward the third interval P1c.

For example, during the first interval P1a, the heating unit 175 may be turned on for 4 seconds, and turned off for 66 seconds repeatedly several times.

Meanwhile, during the second interval P1b, the heating unit 175 may be turned on for 9 seconds, and turned off for 61 seconds repeatedly several times.

Meanwhile, during the third interval P1c, the heating unit 175 may be turned on for 14 seconds, and turned off for 56 seconds repeatedly several times.

Accordingly, during the first period P1, the power outputted from the heating unit 175 may be sequentially increased.

That is, in the case of the first drying mode, the controller 210 may control the power outputted from the heating unit 175 to increase sequentially during the first period P1.

Next, in the first drying mode, after the first period P1, the controller 210 may determine whether the temperature detected by the temperature detector 189 is equal to or lower than the first reference value (S720), and may control the heating unit 175 to continuously output the first power Px during the second period P2, when the detected temperature is equal to or lower than the first reference value (S725).

FIG. 10A illustrates that, after the first period P1, when the temperature detected by the temperature detector 189 is equal to or lower than the first reference level, the heating unit 175 continuously outputs the first power Px during the second period P2.

In this case, the second period P2 is a main heating period in which, when the exhaust temperature from the washing tub 120 is low, the heating unit 175 continuously outputs the first power Px in order to perform a rapid drying.

Meanwhile, the controller 210 may control to operate both the first heater HT1 and the second heater HT2, during the first period P1 and the second period P2.

Meanwhile, at step 720, when the temperature detected by the temperature detector 189 exceeds the first reference value, the controller 210 may determine that the drying of the laundry in the washing tub 120 is considerably performed, during the first period P1 which is a preheating period.

The controller 210 may control the heating unit 175 to continuously output the second power Py which is lower than the first power Px, during the second period P2 (S727).

Figure 10B:
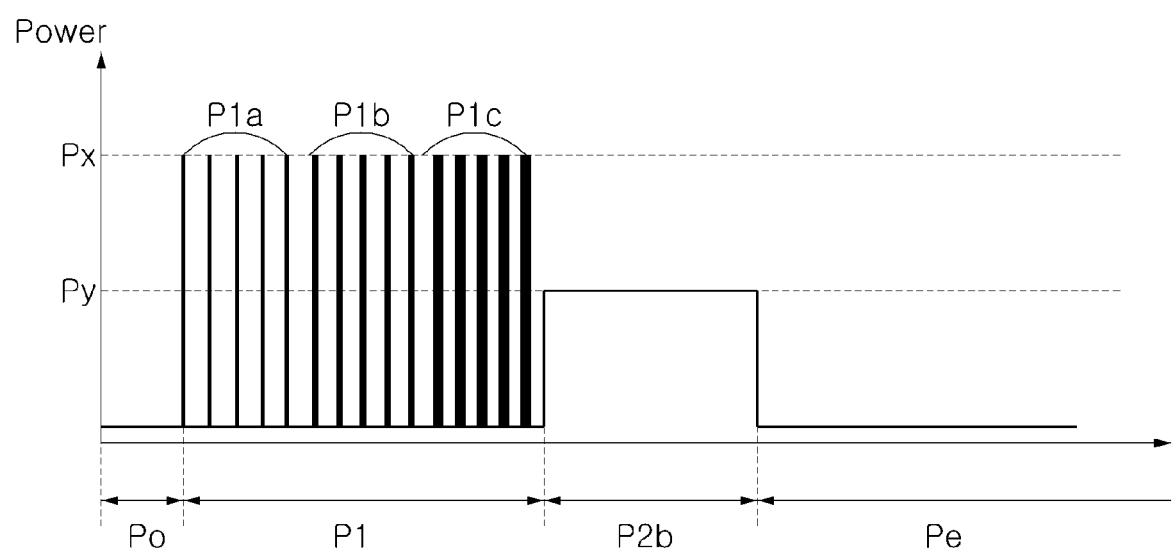

FIG. 10B illustrates that, after the first period P1, when the temperature detected by the temperature detector 189 exceeds the first reference level, the heating unit 175 continuously outputs the second power Py lower than the first power Px, during the second period P2b.

Meanwhile, the controller 210 may control to operate both the first heater HT1 and the second heater HT2 during the first period P1, and to operate either the first heater HT1 or the second heater HT2 during the second period P2b.

That is, the controller 210 may control the power outputted from the heating unit 175 to be constant during the second period (P2 or P2b).

Next, after the second period (P2 or P2b), when the humidity of the washing tub 120 is equal to or lower than the first reference humidity (S730), and when the operation time of the first drying mode is within the second reference value (S735), the controller 210 may control the heating unit 175 to be turned off (S740).

When the humidity detected by the humidity detector 191 is equal to or lower than the first reference humidity, the controller 210 may determine that the drying is performed well. When the operation time of the first drying mode is within the second reference value, it may be determined that drying is performed well within the time.

Accordingly, the controller 210 may control the heating unit 175 to be turned off. At this time, the blower 185 may continue to operate.

As a result, by the residual heat due to the main heating period, drying may be performed.

Figure 10C:
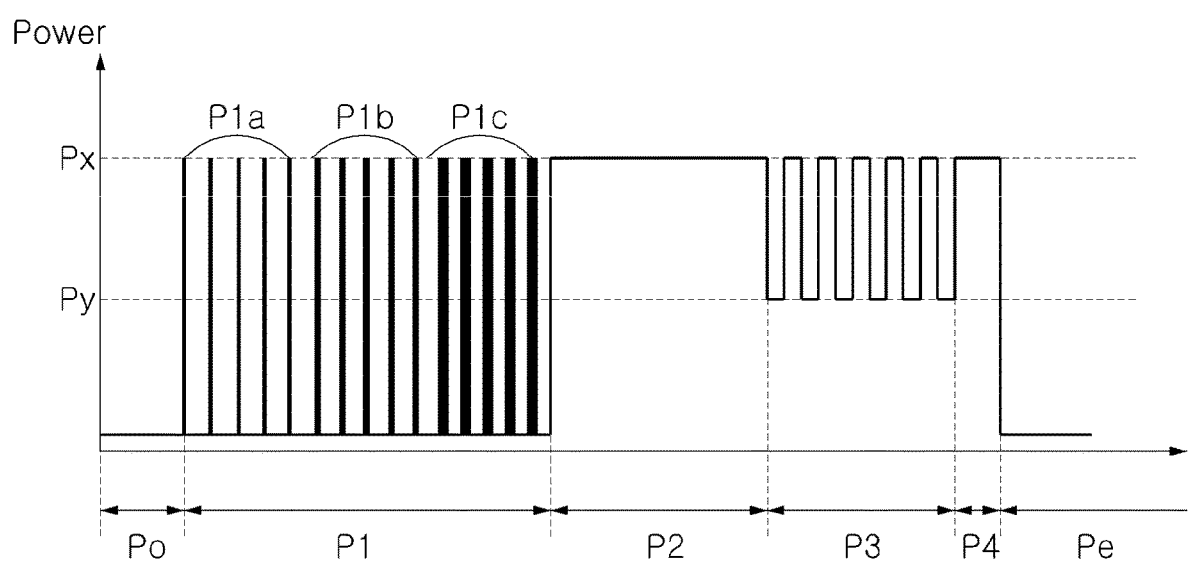

Meanwhile, during the period P4 of FIG. 10C, the controller 210 may determine whether the humidity of the washing tub 120 is equal to or lower than the first reference humidity, and whether the operation time of the first drying mode is within the second reference value.

In addition, when the humidity of the washing tub 120 is equal to or lower than the first reference humidity, and the operation time of the first drying mode is within the second reference value, as shown in FIG. 10C, the controller 210 may control to turn the heating unit 175 off and to operate only the blower 185 during the Pe period.

Meanwhile, in the first drying mode, after the heating unit 175 is turned off, when the humidity of the washing tub 120 is equal to or lower than the second reference humidity which is lower than the first reference humidity (S745), the controller 210 may control the blower 185 to be turned off (S750).

When the humidity of the washing tub 120 is equal to or lower than the second reference humidity lower than the first reference humidity, the controller 210 may determine that drying is completed, and may control the blower 185 to be turned off.

That is, the controller 210 may control the blower 185 to be turned off, after the Pe period of FIG. 10C.

Meanwhile, according to FIG. 8, the eco drying mode may be performed while reducing power consumption, within a short period of time.

Meanwhile, as shown in FIG. 10A, when the heating unit 175 continuously outputs the first power Px during the second period P2, and when the humidity of the washing tub 120 is equal to or lower than the first reference humidity and the operation time of the first drying mode is within the second reference value during the second period P2, the controller 210 may control to turn the heating unit 175 off and control to operate only the blower 185 during the period Pe.

Meanwhile, when the humidity of the washing tub 120 is equal to or lower than the second reference humidity lower than the first reference humidity, the controller 210 may control the blower 185 to be turned off, after the period Pe.

Meanwhile, as shown in FIG. 10B, when the heating unit 175 continuously outputs the first power Px during the second period P2b, and when the humidity of the washing tub 120 is equal to or lower than the first reference humidity and the operation time of the first drying mode is within the second reference value during the second period P2b, the controller 210 may control to turn the heating unit 175 off and control to operate only the blower 185, during the period Pe.

Meanwhile, when the humidity of the washing tub 120 is equal to or lower than the second reference humidity lower than the first reference humidity, the controller 210 may control the blower 185 to be turned off, after the period Pe.

Meanwhile, as shown in FIG. 10C, the controller 210 may control the heating unit 175 to alternately output the first power Px and the second power Py during the third period P3 after the second period P2, and may control the heating unit 175 to output the first power Px during the fourth period P4 after the third period P3.

In addition, as shown in FIG. 10C, when the humidity of the washing tub 120 is equal to or lower than the first reference humidity and the operation time of the first drying mode is within the second reference value during the fourth period P4, the controller 210 may control to turn the heating unit 175 off and control to operate only the blower 185 during the period Pe.

Meanwhile, when the humidity of the washing tub 120 is equal to or lower than the second reference humidity lower than the first reference humidity, the controller 210 may control the blower 185 to be turned off, after the period Pe.

Figure 10D:
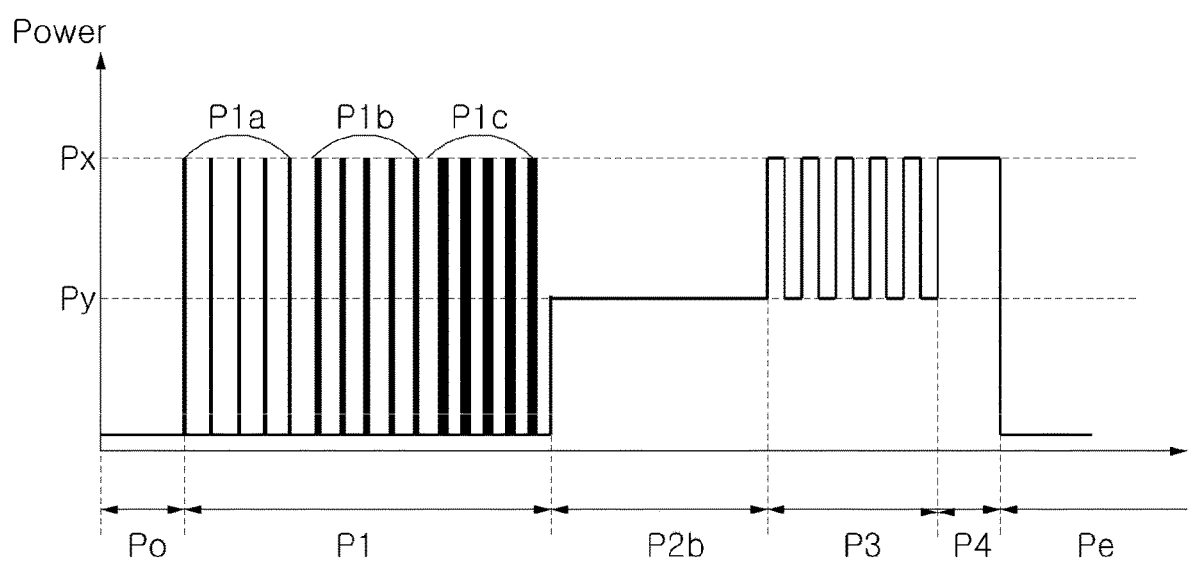

Meanwhile, as shown in FIG. 10d, the controller 210 may control the heating unit 175 to alternately output the first power Px and the second power Py, during the third period P3, after the second period P2b for continuously outputting the second power Py, and may control the heating unit 175 to output the first power Px during the fourth period P4 after the third period P3.

In addition, as shown in FIG. 10D, when the humidity of the washing tub 120 is equal to or lower than the first reference humidity and the operation time of the first drying mode is within the second reference value during the fourth period P4, the controller 210 may control to turn the heating unit 175 off and control to operate only the blower 185 during the period Pe.

Meanwhile, when the humidity of the washing tub 120 is equal to or lower than the second reference humidity lower than the first reference humidity, the controller 210 may control the blower 185 to be turned off, after the period Pe.

Figure 10E:
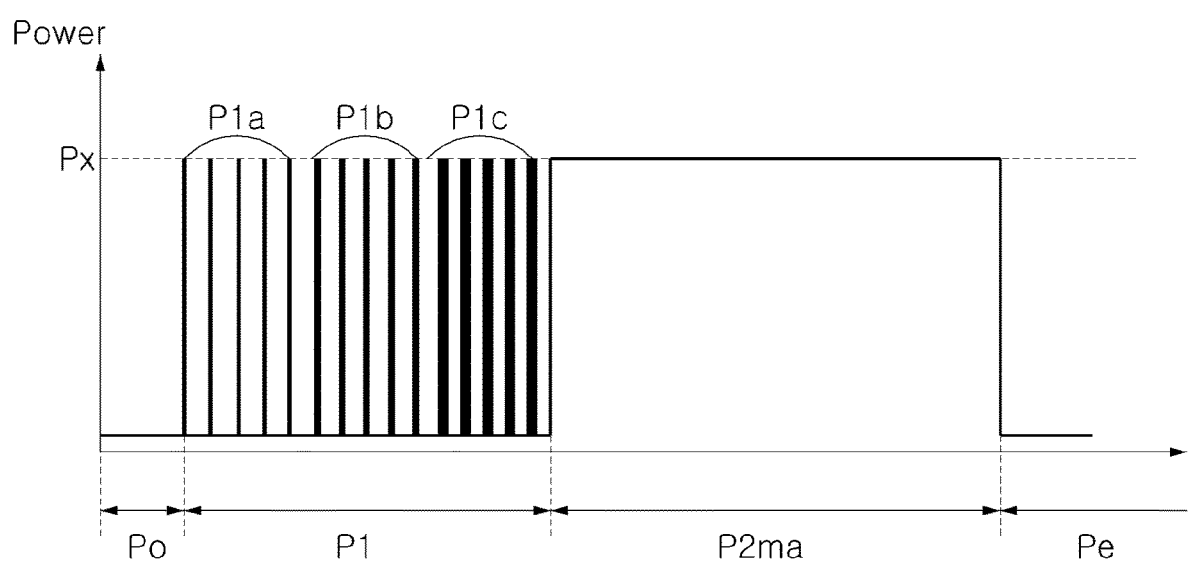

Meanwhile, as shown in FIG. 10E, when the humidity of the washing tub 120 is equal to or lower than the first reference humidity and the operation time of the first drying mode is within the second reference value during a second period P2ma for continuously outputting the second power Px, the controller 210 may control to turn the heating unit 175 off and control to operate only the blower 185 during the period Pe.

Meanwhile, when the humidity of the washing tub 120 is equal to or lower than the second reference humidity lower than the first reference humidity, the controller 210 may control the blower 185 to be turned off, after the period Pe.

Figure 10F:
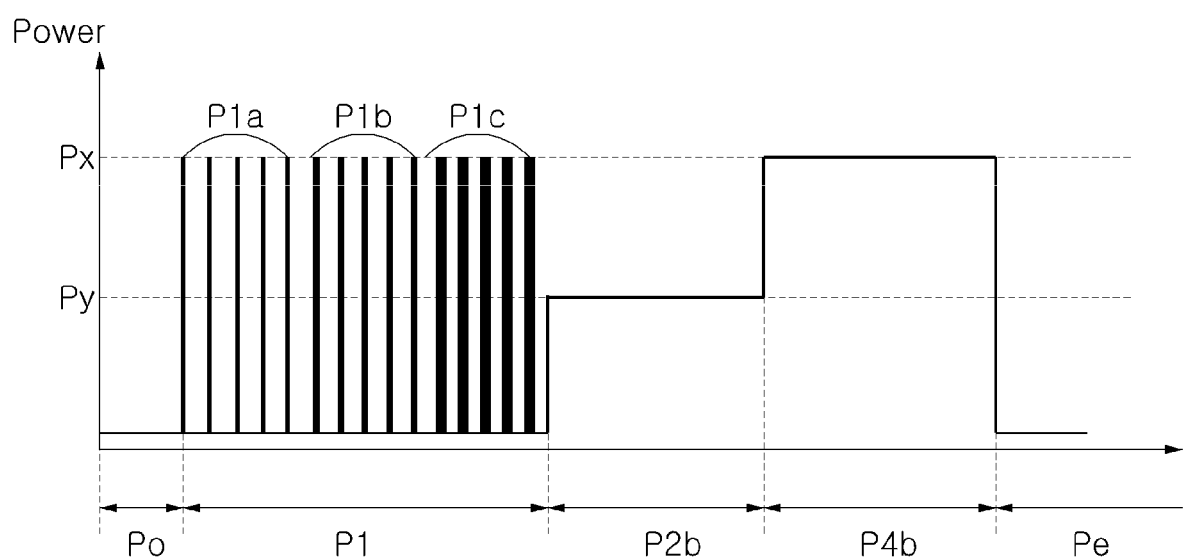

Meanwhile, as shown in FIG. 10F, the controller 210 may control the heating unit 175 to output the first power Px, during the fourth period P4b, after the second period P2b for continuously outputting the second power Py.

In addition, as shown in FIG. 10F, when the humidity of the washing tub 120 is equal to or lower than the first reference humidity and the operation time of the first drying mode is within the second reference value during the fourth period P4b, the controller 210 may control to turn the heating unit 175 off and control to operate only the blower 185 during the period Pe.

Meanwhile, when the humidity of the washing tub 120 is equal to or lower than the second reference humidity lower than the first reference humidity, the controller 210 may control the blower 185 to be turned off, after the period Pe.

Meanwhile, in the first drying mode, the controller 210 may control the first period P1 and the second period P2 or P2b to increase, in proportion to the amount of the laundry in the washing tub 120.

Meanwhile, in the state of the first drying mode, the controller 210 may control the turned-on period of the heating unit 175 to increase in proportion to the amount of the laundry in the washing tub 120, during the first interval to the third interval (P1a to P1c) of the first period P1.

This will be described with reference to FIG. 11A and FIG. 11B.

Figure 11A:
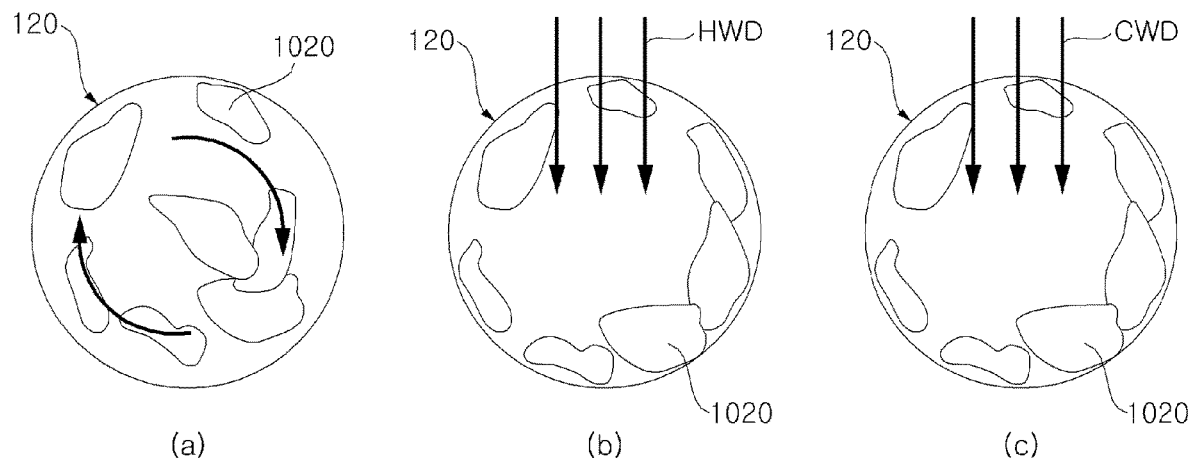
Figure 11B:
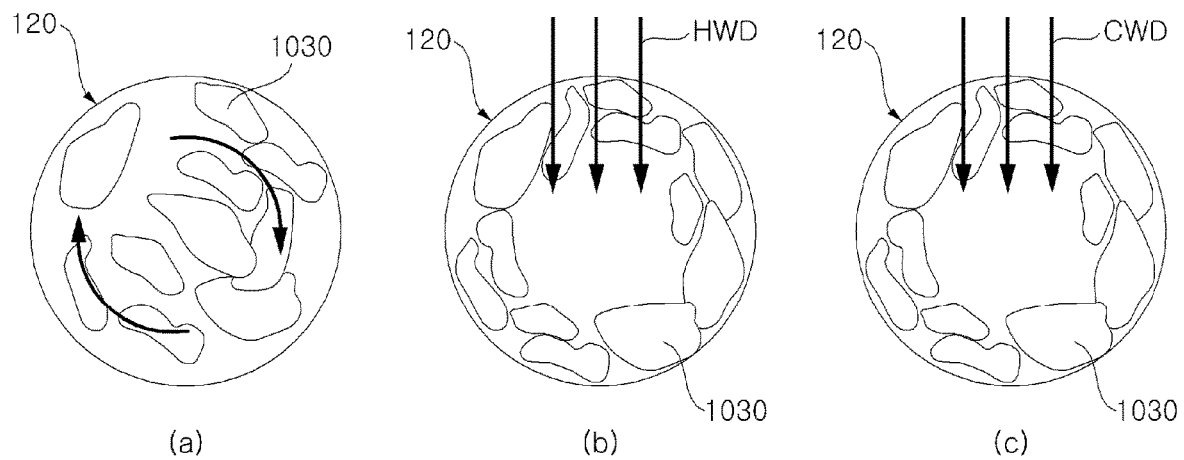

FIG. 11A illustrates that the first drying mode is performed when the amount of the laundry is small, and FIG. 11B illustrates that the second drying mode is performed when the amount of the laundry is larger than that of FIG. 11A.

As shown in FIG. 11A(a), during the period P0, the loosening of laundry may be performed to disperse a laundry 1020 in the washing tub 120, and only the blower 185 may be operated without operating the heating unit 175.

Next, as shown in FIG. 11A(b), during the period P1, the heating unit 175 and the blower 185 may operate to supply a hot wind HWD into the washing tub 120.

Next, as shown in FIG. 11A(c), during the period P1, the heating unit 175 may be turned off, and only the blower 185 may operate to supply a cold wind CWD into the washing tub 120.

Meanwhile, as shown in FIG. 11B(a), during the period P0, the loosening of laundry may be performed to disperse a laundry 1030 in the washing tub 120, and only the blower 185 may be operated without operating the heating unit 175.

Next, as shown in FIG. 11B(b), during the period P1, the heating unit 175 and the blower 185 may operate to supply a hot wind HWD into the washing tub 120.

Next, as shown in FIG. 11B(c), during the period P1, the heating unit 175 may be turned off, and only the blower 185 may operate to supply a cold wind CWD into the washing tub 120.

Meanwhile, since the amount of the laundry 1030 of FIG. 11B is larger than that of FIG. 11A, it is preferable that the turned-on period of the heating unit 175 in the period P1 is longer than that of FIG. 11A. Meanwhile, it is preferable that the turned-off period of the heating unit 175 in the period P1 is shorter.

Meanwhile, since the amount of the laundry 1030 of FIG. 11B is larger than that of FIG. 11A, it is possible that the period P1 itself is longer than that of FIG. 11A. Thus, the drying period can be adjusted in response to the amount of the laundry.

Meanwhile, the operating method of the laundry treatment machine of FIGS. 8 to 11B may also be applicable to a laundry treatment machine of a top load type in which the laundry is inserted into the washing tub from the top.

The laundry treatment machine according to the embodiment of the present invention is not limited to the configuration and method of the embodiments described above, but all or some of the embodiments may be selectively combined to achieve various modifications.

Meanwhile, the operating method of the laundry treatment machine of the present invention can be implemented as a code, which can be read by a processor, in a processor-readable recording medium provided in the laundry treatment machine. The processor-readable recording medium may include all types of recording apparatuses in which data that can be read by the processor is stored.

According to an embodiment of the present invention, a laundry treatment machine includes: a casing; a door attached to the casing; a washing tub disposed inside the casing; a heating unit; a blower for supplying to the washing tub; a temperature detector for detecting a temperature of the washing tub; a motor for rotating the washing tub; a driving unit for driving the motor; and a controller to control the blower to operate in a first drying mode, and to control the heating unit to intermittently output a first power during a first period after the operation of the blower while controlling an operating time of the heating unit to increase during the first period, so that the power consumption can be reduced while reducing the drying period in the drying mode.

Particularly, in the first drying mode, the controller controls the heating unit to be repeatedly turned on and off during a first interval to a third interval of the first period, and to control a turned-on period of the heating unit to increase when proceeding from the first interval to the third interval, so that it is possible to smoothly perform the drying while reducing the power consumption in the first period which is an initial drying period. Accordingly, the entire drying period can be reduced.

Particularly, in the first drying mode, the controller controls the turned-on period of the heating unit to increase in proportion to an amount of laundry in the washing tub, during the first interval to the third interval of the first period, so that the entire drying period can be adjusted in response to the amount of the laundry.

Meanwhile, in the first drying mode, the controller controls the first period and the second period to increase in proportion to an amount of laundry in the washing tub, so that the entire drying period can be adjusted in response to the amount of the laundry.

Meanwhile, in the second drying mode, wherein the controller controls the heating unit to continuously output the first power, controls the heating unit to continuously output a second power lower than the first power after outputting the first power, and controls the heating unit to continuously output the first power again after outputting the second power, so that the drying period can be shortened.

According to another embodiment of the present invention, a laundry treatment machine includes: a casing; a door attached to the casing; a washing tub disposed inside the casing; a heating unit; a blower for supplying to the washing tub; a temperature detector for detecting a temperature of the washing tub; a motor for rotating the washing tub; a driving unit for driving the motor; and a controller to control, in a first drying mode, a power outputted from the heating unit to increase sequentially during a first period, and to control the power outputted from the heating unit to be constant during a second period, so that the power consumption can be reduced while reducing the drying period in the drying mode.

Meanwhile, according to another embodiment of the present invention, in the second drying mode, the controller controls the heating unit to continuously output a first power, controls the heating unit to continuously output a second power lower than the first power after outputting the first power, and controls the heating unit to continuously output the first power again after outputting the second power, so that the drying period can be reduced.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. A laundry treatment machine comprising:
   a casing;
   a door coupled to the casing;
   a washing tub located inside of the casing and configured to receive laundry;
   a blower configured to supply air to the washing tub;
   a heating unit configured to receive power and to generate heat based on the received power to heat air;
   a temperature detector configured to detect a temperature in the washing tub;
   a motor configured to rotate the washing tub; and
   a controller electrically connected to the blower, the heating unit, and the temperature detector,
   wherein the controller is configured to:
      enter a first drying mode,
      operate the blower in the first drying mode, based on operation of the blower in the first drying mode, control supply of power to the heating unit during a first period of the first drying mode in which a first level of power is intermittently supplied to the heating unit for an operation time, increase the operation time of the heating unit during the first period, the first period comprising a first interval, a second interval after the first interval, and third interval after the second interval, during the first interval, turn on the heating unit for a first turn-on period, and then turn off the heating unit for a first turn-off period that is longer than the first turn-on period, during the second interval, turn on the heating unit for a second turn-on period that is longer than the first turn-on period, and then turn off the heating unit for a second turn-off period that is shorter than the second turn-on period, during the third interval, turn on the heating unit for a third turn-on period that is longer than the second turn-on period, and then turn off the heating unit for a third turn-off period that is shorter than the third turn-on period, and use the first level of power supplied to the heating unit for the first turn-on period, the second turn-on period, and the third turn-on period.

2. The laundry treatment machine of claim 1, wherein the controller is further configured to, in the first drying mode:

during the first interval, repeatedly turn the heating unit on for the first turn-on period and off for the first turn-off period, and during the second interval, repeatedly turn the heating unit on for the second turn-on period and off for the second turn-off period.

3. The laundry treatment machine of claim 2, wherein the controller is further configured to:

detect an amount of laundry in the washing tub by a current detector electrically connected to the motor, and in the first drying mode, increase one or both of the first turn-on period during the first interval of the first period and the second turn-on period during the second interval of the first period based on the amount of laundry in the washing tub.

4. The laundry treatment machine of claim 1, wherein the controller is further configured to, in the first drying mode:

detect, based on output from the temperature detector, the temperature in the washing tub after the first period; and based on the temperature in the washing tub being less than or equal to a first reference value, maintain supply of power to the heating unit at the first level during a second period of the first drying mode.

5. The laundry treatment machine of claim 4, wherein the heating unit comprises a first heater and a second heater, and wherein the controller is further configured to operate both of the first heater and the second heater during each of the first period and the second period.

6. The laundry treatment machine of claim 4, wherein the controller is further configured to, in the first drying mode:

control supply of power to the heating unit alternately between the first level and a second level that is less than the first level during a third period of the first drying mode, the third period following the second period; and maintain supply of power to the heating unit at the first level during a fourth period of the first drying mode, the fourth period following the third period.

7. The laundry treatment machine of claim 4, wherein the controller is further configured to, in the first drying mode:

determine a humidity level in the washing tub; and turn off the heating unit based on the humidity level being less than or equal to a first reference humidity level and a lapse of time in the first drying mode being within a set time.

8. The laundry treatment machine of claim 7, wherein the controller is further configured to, based on the heating unit being turned off, turn off the blower based on the humidity level in the washing tub being less than or equal to a second reference humidity level that is less than the first reference humidity level.

9. The laundry treatment machine of claim 4, wherein the controller is further configured to:

detect an amount of laundry in the washing tub by a current detector electrically connected to the motor, and in the first drying mode, increase one or both of the first period and the second period based on the amount of laundry in the washing tub.

10. The laundry treatment machine of claim 1, wherein the controller is further configured to, in the first drying mode:

detect, by the temperature detector, the temperature in the washing tub after the first period; and based on the temperature in the washing tub exceeding a first reference value after the first period, control supply of power to the heating unit during a second period of the first drying mode at a second level of power that is less than the first level, the second period following the first period.

11. The laundry treatment machine of claim 10, wherein the heating unit comprises a first heater and a second heater, and wherein the controller is further configured to:

operate both of the first heater and the second heater during the first period, and operate one of the first heater or the second heater during the second period.

12. The laundry treatment machine of claim 10, wherein the controller is further configured to, in the first drying mode:

control supply of power to the heating unit alternately between the first level and the second level during a third period of the first drying mode, the third period following the second period; and maintain supply of power to the heating unit at the first level during a fourth period of the first drying mode, the fourth period following the third period.

13. The laundry treatment machine of claim 1, wherein the controller is further configured to:

enter a second drying mode;

maintain, in the second drying mode, supply of power to the heating unit at the first level;

after maintaining supply of power to the heating unit at the first level in the second drying mode, maintain supply of power to the heating unit at a second level that is less than the first level; and after maintaining supply of power at the second level in the second drying mode, maintain supply of power to the heating unit at the first level.

* * * * *